United States Patent [19]

Kamada et al.

[11] 4,291,097

[45] Sep. 22, 1981

[54] SCRATCH-RESISTANT, DYEABLE COATING COMPOSITIONS FOR SYNTHETIC RESIN ARTICLES

[75] Inventors: Kazumasa Kamada; Isao Sasaki; Kenji Kushi, all of Ohtake, Japan

[73] Assignee: Mitsubishi Rayon Co., Ltd., Tokyo, Japan

[21] Appl. No.: 103,625

[22] Filed: Dec. 14, 1979

[30] Foreign Application Priority Data

Dec. 22, 1978 [JP] Japan .............................. 53-160561

[51] Int. Cl.³ ............................................. B05D 3/06
[52] U.S. Cl. ............................... 428/412; 204/159.22; 260/33.4 R; 427/44; 427/54.1; 427/162; 427/164; 428/520; 526/277
[58] Field of Search ............. 204/159.22; 260/33.4 R; 526/208, 211, 277, 313, 320, 323.2; 427/44, 54, 162, 163, 164; 428/412, 515, 520

[56] References Cited

U.S. PATENT DOCUMENTS

| | | | |
|---|---|---|---|
| 2,384,119 | 9/1945 | Muskat et al. | 260/475 |
| 3,551,311 | 12/1970 | Nass et al. | 204/159.18 |
| 3,635,756 | 1/1972 | Shepherd et al. | 427/54 |
| 4,071,508 | 1/1978 | Steckler | 526/277 |
| 4,198,465 | 4/1980 | Moore et al. | 427/164 |
| 4,199,421 | 4/1980 | Kamada et al. | 204/159.22 |

*Primary Examiner*—John H. Newsome
*Attorney, Agent, or Firm*—Cushman, Darby & Cushman

[57] ABSTRACT

Coating compositions comprising a polyfunctional monomer of a mono or polypentaerythritol poly(meth-)acrylate, a bifunctional (meth)acrylate having specific monomer structure, an additional (meth)acrylate containing not more than 2 (meth)acryloyloxy groups, a phosphoric acid ester and an ethanolamine all blended together in a suitable organic solvent system together with a photosensitizer are disclosed. The compositions provide a scratch-resistant, hard cross-linked film surface that is dyeable and resists static and fogging to a synthetic resin article, such as polymethyl methacrylate, to which they are applied.

21 Claims, No Drawings

SCRATCH-RESISTANT, DYEABLE COATING COMPOSITIONS FOR SYNTHETIC RESIN ARTICLES

BACKGROUND OF THE INVENTION

The present invention relates to a coating composition which forms a dyeable, cross-linked, hardened film on a substrate to which it is applied, the film exhibiting high abrasion resistance, surface smoothness, antistaticity and cloud prevention properties when cured by irradiation with active energy rays in air.

Synthetic resin moldings made of polymethyl methacrylate, polycarbonate or polyallyldiglycol carbonate materials have various commercial advantages in that they are not only lighter in the weight and substantially more shockproof than a glass product, but they are also cheaper in price and easier to fabricate and mold than glass products. Accordingly, these materials have several practical applications in replacements for their glass counterparts such as organic glass plates, light fixture covers and diffusion panels, optical lenses, eyeglass lenses, sunglass lenses, reflectors and mirrors, display panels, signboards, commercial advertising displays, name plates, dust cover cases as well as automobile parts.

However, conventional synthetic resin moldings are particularly deficient in surface abrasion resistance properties and are susceptible to damage on the surfaces by contact with other objects, shocks and scratches during the transportation and storage or use. These surface scratches are not only detractive from an appearance aspect but also affect the properties of the article, for instance, scratches in the molded synthetic article when used as an optical surface in an optical device. A polyfunctional (meth)acrylate monomer has been described as exhibiting high cross-linking hardening on polymerization when irradiated with active energy rays and is effective to improve the abrasion resistance of the surface of a synthetic resin molding. This has been disclosed, for example, in U.S. patent application Ser. No. 878,830 filed on Feb. 17, 1978, now U.S. Pat. No. 4,199,421. Although synthetic resin moldings made by such a procedure have an excellent abrasion resistance and surface smoothness, they are likely to be readily staticized so as to attract and deposit dust or the like and have been difficult to dye. In addition, the coated surfaces of the resin moldings are easily clouded in humid environments.

SUMMARY OF THE INVENTION

As a result of our further investigation, we have discovered that when a phosphate-type monomer and ethanolamine-type compound, both having specific structures, are used as mixed together, the antistaticity and dyeability can be substantially improved while maintaining the desirable abrasion resistance and surface smoothness. We have also found that the cloud prevention ability can be imparted to the resin moldings by using polyethyleneglycol (meth)acrylate as one component of the coating composition.

Thus, according to its composition aspect, the present invention provides a polyfunctional coating material composition which contains 5 to 90 parts by weight of a monomer mixture (A) consisting of 1. From 30 to 95% by weight of the polyfunctional monomer of a mono or polypentaerythritol poly(meth)acrylate having at least three (meth)acryloyloxy groups in a given molecule and represented by the following general formula

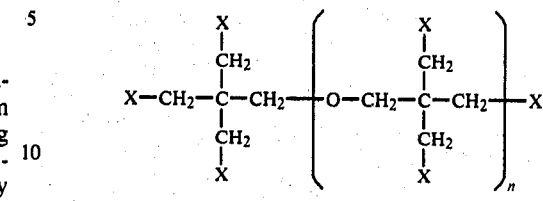

in which at least 3 of X are $CH_2=CR-COO-$ groups and the rest are $-OH$ groups, n is an integer of 0 to 4 and R is hydrogen or a methyl group.

2. From 0 to 60% by weight of a bifunctional monomer represented by the following formula

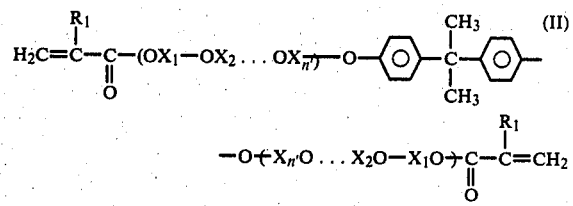

where $R_1$ is hydrogen or a methyl group, $X_1$, $X_2$, $-X_n$ are the same or different alkylene groups containing not more than 6 carbon atoms or an alkylene-type group in which one hydrogen atom is replaced with a hydroxyl group, and n' is an integer of 0 to 5.

3. From 3 to 40% by weight of a monomer having not more than 2 (meth)acryloyloxy groups in one molecule, a boiling point not below 150° C. under the normal pressure and a viscosity not higher than 20 centipoises at 20° C.

4. From 1 to 20% by weight of a phosphoric acid ester-type monomer represented by the following general formula:

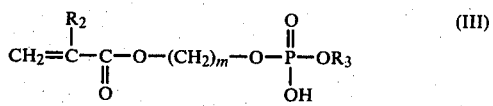

in which $R_2$ is hydrogen or a methyl group, $R_3$ is hydrogen or a

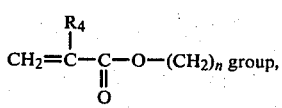

where $R_4$ is hydrogen or a methyl group, and m and n are integers of 1 to 5 and 5. From 1 to 10% by weight of an ethanolamine-type compound represented by the following general formula:

in which both $R_5$ and $R_6$ are hydrogen, an alkyl group of 1 to 15 carbon atoms or $CH_2CH_2OH$ groups;

(B) From 95 to 10 parts by weight of at least one organic solvent that provides a uniform solution when mixed with monomer mixture (A); and (C) From 0 to 10 parts by weight of a photosensitizing agent, calculated per 100 parts by weight of the total of monomer mixture (A) and organic solvent (B); the coating composition characterized by forming a dyeable, cross-linked, hardened film exhibiting high abrasion resistance, surface smoothness and antistaticity when irradiated with active energy rays in air.

Having generally described the primary components of the coating composition above, a detailed description of each of the components thereof will now be given. It will be understood that certain of the above-listed ingredients are optional in the composition, however, when included they are present to the extent of at least 0.1% by weight of the monomer mixture A.

DESCRIPTION OF THE PREFERRED EMBODIMENTS

The polyfunctional monomer (1) of a mono or poly-pentaerythritol poly(meth)acrylate is represented by the following general formula:

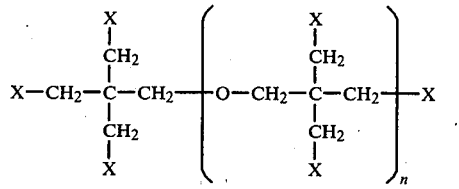

in which at least 3 of X are $CH_2=CR-COO-$ groups and the rest are $-OH$ groups, n is an integer of 0 to 4 and R is hydrogen or a methyl group.

These monomers exhibit a very high polymerization activity when irradiated with active energy rays and form a cross-linked, hardened polymer exhibiting a high abrasion resistance. In the present invention, by using the polyfunctional monomer (1) represented by the above formula (I), these objects can be readily attained. As a preferred class of monomers, we mention pentaerythritol tri(meth)acrylate, pentaerythritol tetra(meth)acrylate, dipentaerythritol tetra(meth)acrylate, dipentaerythritol penta(meth)acrylate and dipentaerythritol hexa(meth)acrylate as highly desirable monomers with respect to the polymerization activity when irradiated with active energy rays in air. Of course, it will be understood that one or more of the polyfunctional monomers (1) represented by the above general formula (I) may be employed.

The amount of polyfunctional monomer (1) is contained in the compositions of the invention is about 30 to about 95% by weight, or preferably about 35 to about 94% by weight, of the mixture (A). We have found that in instances where the amount of the polyfunctional monomer (1) is less than 30% by weight of the monomer mixture (A), no hardened film having a sufficient abrasion resistance is obtained. On the other hand, in instances where this amount exceeds 95% by weight, the smoothness of the film is substantially reduced.

According to the present invention, various polyfunctional monomers that do not have fewer than 3(meth)acryloyloxy groups in one molecule and do not respond to the above-mentioned general formula (I) as, for example, trimethylolpropane tri(meth)acrylate, trimethylolethane tri(meth)acrylate or pentaglycerol tri(meth)acrylate have been found to be deficient in polymerization activity when irradiated with active energy rays in air, are not well cross-linked and thus do not suitably harden the coating film.

The bifunctional monomer (2), when included in the coating composition together with the polyfunctional monomer (1), is a monomer which imparts a certain degree of flexibility to the cross-linked hardened film without reducing its abrasion resistance. Further, this component is desirable as it is the coating adhesion to the base material and imparts an air hardenability when irradiated with active energy rays. The bifunctional (meth)acrylate monomer is represented by the following general formula:

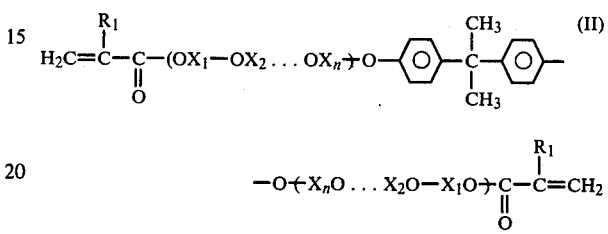

in which $R_1$ is hydrogen or a methyl group, $X_1$, $X_2$, $-X_n$, which may be the same or different are alkylene groups containing not more than 6 carbon atoms, or an alkylene-type structure in which one hydrogen atom is replaced with a hydroxyl group; n is ain integer of 0 to 5.

Considering the bifunctional monomer represented by this general formula, we have found that in those instances in which the carbon atoms of $X_n$ are not less than 7 and the value of n is not less than 6, either the abrasion resistance of the cross-linked hardened film will be reduced, the adhesion to the base material will be reduced, or both. Thus, preferred are monomers of $X_n$ containing not more than 3 carbon atoms and n having a value of not more than 3.

As specific examples of the bifunctional monomer (2) represented by the above mentioned general formula, there may be mentioned 2,2 bis(4 acryloxyphenyl)propane; 2,2 bis (4 metharyloxyphenyl)propane; 2,2 bis(4 acryloxyethoxyphenyl)-propane; 2,2 bis(4 methacryloxyethoxyphenyl)propane; 2,2 bis(4 acryloxydiethoxyphenyl)propane; 2,2 bis(4 methacryloxydiethoxyphenyl)propane; 2,2 bis(4 acryloxypropoxyphenyl)propane; 2,2 bis(4 methacryloxypropoxyphenyl) propane; 2,2 bis[4 acryloxy(2 hydroxypropoxy)phenyl] propane; 2,2 bis[4 methacryloxy(2 hydroxypropoxy) phenyl] propane; 2,2 bis[4 acryloxy(2 hydroxypropoxyethoxy)-phenyl]propane and 2,2 bis[4 methacryloxy(2 hydroxypropoxyethoxy)phenyl]propane.

It will be understood that any one of these monomers can be used alone, or two or more of them may be used as a mixture provided the total amount is within the composition range. The quantity of the bifunctional monomer (2) represented by the above general formula (II) is 0 to 60% by weight of the total monomer mixture (A). In the event that the amount of the bifunctional monomer (1) is present in excess of 60% by weight in the monomer mixture (A), the abrasion resistance of the resulting crosslinked, hardened film will be markedly reduced.

Further, the monomer (3) which is used in conjunction with the polyfunctional monomer must contain not more than two (meth)acryloyloxy groups per molecule and is as monomer having a boiling point not less than 150° C. under atmospheric pressure and a viscosity not greater than 20 centipoises at 20° C. For convenience, this monomer will be referred to as monomer (3) hereinafter. The presence of this monomer is necessary to give a smooth surface so as to be considered a mirror-smooth surface to the surface of the coating formed after the coating composition is applied to the molding and to give the hardened film a high degree of flexibility and adhesion to the base material. Thus, in order to form a coating film that is completely smooth after the molding is painted with the coating composition of the present invention, it is preferable that the viscosity of the monomer mixture (A) is not greater than 1000 centipoises and, in order to give the hardened coat the same smoothness, flexibility and adhesion to the base material, it is necessary to simultaneously use the monomer (3) and meet the prescribed chemical and physical conditions as mentioned above.

The following is mentioned as specific examples of materials that may be conveniently used as monomer (3): Neopentylglycol di(meth)acrylate; ethyleneglycol di(meth)acrylate; diethyleneglycol di(meth)acrylate; triethyleneglycol di(meth)acrylate; tetraethyleneglycol di(meth)acrylate; 1,3-butylene di(meth)acrylate; 1,4-butanediol di(meth)acrylate; 1,6-hexanediol di(meth)acrylate; 1,3-propyleneglycol di(meth)acrylate; butyl(meth)acrylate; isobutyl(meth) acrylate; t-butyl(meth)acrylate; 2-ethylhexyl(meth)acrylate; lauryl(meth)acrylate; tridecyl(meth)acrylate; cyclohexyl(meth)acrylate; 2-hydroxyethyl(meth)acrylate; 2-hydroxypropyl(meth)acrylate; glycidyl(meth)acrylate; tetrahydrofurfuryl(meth)acrylate; benzyl(meth)acrylate; 1,4-butyleneglycol mono(meth)acrylate; ethoxyethyl(meth)acrylate; ethylcarbitol(meth)acrylate; 2-hydroxy-3-chloropropyl(meth)acrylate and dipropyleneglycol di(meth)acrylate.

Of the above mentioned monomers, in the case of the present invention, such monomers having a hydroxyl group and/or cyclic ether bond and/or chain ether bond in the side chain or between two (meth)acryloyloxy groups as diethyleneglycol di(meth)acrylate; triethyleneglycol di(meth)acrylate; tetraethyleneglycol dimethacrylate; 2-hydroxyethyl(meth)acrylate; 2-hydroxypropyl(meth)acrylate; glycidyl(meth)acrylate; tetrahydrofurfuryl(meth)acrylate; ethoxyethyl(meth)acrylate; ethylcarbitol(meth)acrylate; butoxyethyl(meth)acrylate; 1,4-butyleneglycol mono(meth)acrylate and dipropyleneglycol di(meth)acrylate have been found to be particularly high in polymerization activity in air and as such are particularly preferably used. Any one of the monomers (3) can be used alone, or two or more of them may be used as mixture, provided that the total amount used is within the composition range.

The amount of monomer (3) used is preferably about 3 to about 40% by weight of the monomer mixture (A). In instances in which the amount of the monomer (3) is less than 3% by weight in the monomer mixture (A), the viscosity of the coating composition is not readily reduced to acceptable operational values and therefore smooth surface moldings are not obtained. On the other hand, in case the monomer (3) is present in excess of 40% by weight, no crosslinked hardened film having sufficient abrasion resistance will be obtained. Further, in instances in which the boiling point of the monomer (3) is below 150° C. under the normal or atmospheric pressure, when the coating composition is applied to the surface of the molding and is hardened, monomer (3) will volatilize and escape to the air resulting in an elevation of the viscosity of the coating composition. If the viscosity of the monomer (3) exceeds 20 centipoises at 20° C., the viscosity of the monomer mixture (A) cannot be effectively reduced.

The phosphoric acid ester-type monomer (4) used in accordance with the present invention contains at least one (meth)acryloyloxy group as indicated by formula (III). As specific examples, there may be mentioned (meth)acryloxypropyl phosphate and (meth)acryloxybutyl phosphate. We have found that other halogenated vinyl phosphates and alkyl-substituted vinyl phosphates having no (meth)acryloyloxy group to obstruct the air hardenability, do not improve the antistaticity and dyeability. Even the compound having a (meth)acryloyloxy group must contain at least one OH group in the phosphoric acid group. In the event that there is no OH group in the molecule, the effect of the use of monomer (4) together with the presence of the ethanolamine-type compound (5) will be markedly reduced.

The ethanolamine-type compound (5) to be used in the compositions of the present invention is an alkylamine having at least one $CH_2CH_2OH$ group, as shown in formula (IV). An alkylamine containing no $CH_2CH_2OH$ group shows substantially no effect in improving antistaticity.

Preferably, the number of carbon atoms in the N-substituted alkyl group is from 1 to 15, and when the number of carbon atoms exceeds 15 the solubility in the solvent from the monomer mixture will be reduced.

When preparing the coating compositions according to the present invention, it is an essential requirement to use both the phosphoric acid ester-type monomer (4) and ethanolamine-type compound (5). Even if one monomer of the other is used by itself, the desired effect in respect of both antistaticity and dyeability will not be achieved. When mixed together, the phosphoric acid ester-type monomer and ethanolamine-type-compound react exothermically with each other to form a complex, and it is found that this complex serves to remarkably improve the hydrophilicity and develop the antistaticity and dyeability of the resulting coating. Indeed, this is one of the most significant features of the present invention.

There are, of course, in theory some modifications available to adjust and alter the properties of the coating materials. Thus, if only the antistaticity and dyeability are to be imparted to the coating, a conventional method such as adding a surface active agent or a hydrophilic compound having a dyeing receptor, may be used. On the other hand, this procedure greatly reduces the abrasion resistance and appearance and therefore cannot be put into commercial practice. However, when the phosphoric acid ester-type monomer and ethanolamine-type compound of the present invention are used as mixed, when irradiated with active energy rays in air a cross-linked hardened film will be obtained without reducing the abrasion resistance and appearance at all.

The amount of the phosphoric acid ester-type monomer (4) is used in the coating compositions of the invention is from about 1 to about 20% by weight, or preferably about 3 to about 15% by weight, of the monomer mixture (A). When the phosphoric acid ester-type monomer amount is less than 1% by weight, sufficient antistaticity and dyeability are not obtained, and when the amount of the monomer exceeds 20% by weight, the hardened film is easily clouded and has a reduced transparency.

The amount of the ethanolamine-type compound used in the coating compositions of the invention is about 1 to about 10% by weight, and preferably about 2 to about 6% by weight, of the monomer mixture. When the amount is less than 1% by weight, no sufficient antistaticity and dyeability values are obtained while when the amount exceeds 10% by weight both the surface smoothness and hardness of the hardened film are reduced.

If the amounts of the phosphoric acid ester-type monomer (4) and ethanolamine type compound (5) used together are within the required quantity parameters, various combinations may be used. However, we prefer to use a mixture within the weight ratio of (4) to (5) of 0.5:1 as a particularly useful range.

As an optional ingredient there may be included in the monomer mixture (A) from about 3 to about 40% by weight of (6) a polyethyleneglycol mono- or di(meth)acrylate monomer of the formula:

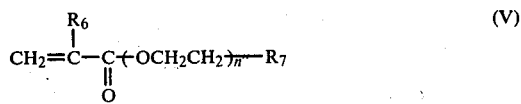

in which $R_6$ is hydrogen or a methyl group, $R_7$ is an alkoxy or a (meth)acryloyloxy group of 1 to 5 carbon atoms and $n''$ is an integer of 5 to 30 carbon atoms. The viscosity of monomer mixture (A) is preferably not greater than about 1,000 centipoise at 20° C.

The organic solvent component (B) of the coating composition is used with the monomer mixture (A) in order to form a flowable, coatable coating composition. The solvent component is used to impart a desirable effect to the painting workability and uniform film-forming properties of the composition as in the case of applying the novel coating composition to the surface of a synthetic resin molding. The organic solvent component also assists in the storage stability and to increase the adhesion of the crosslinked hardened film to the base material.

The organic solvent or mixture of solvents to be used in the present invention must satisfy at least the following conditions:

(1) The organic solvent should form a uniform, complete solution when mixed with the polyfunctional (meth)acrylate monomer mixture (A);

(2) The boiling point of the organic solvent when measured under normal or atmospheric pressure should be from about 50° to about 200° C.;

(3) The viscosity at room temperature of 20° C. should not be greater than 10 centipoises, and (4) The amount of the organic solvent or mixture of solvents used should be at the rate of 95 to 10 parts by weight, the balance being a corresponding 5 to 90 parts by weight of the polyfunctional (meth)acrylate mixture (A), meaning the total is 100 parts by weight. An initial requirement is that the organic solvent form a uniform solution with the polyfunctional(meth)acrylate monomer mixture (A). Care must be taken in selecting an appropriate solvent or solvent system in order to achieve the desired properties of the coating compositions. For instance, when saturated hydrocarbon-type organic solvents, such as n-hexane, n-heptane or cyclohexane are used, a uniform solution is not formed. The second requirement is that the boiling point under the normal or atmospheric pressure should be in the range of about 50° to 200° C. and this is an important requirement in order to form a uniform film when the surface of the synthetic resin molding is coated or to form a crosslinked hardened film that has a completely smooth surface. When the boiling point under normal pressure is below 50° C., after the coating material composition is applied the base material surface will be cooled by the latent heat of the organic solvent evaporating from the coating film, the moisture in air will condense at the site of cooling and the surface smoothness of the coating film will be sacrificed. By contrast, if the boiling point is in excess of 200° C., the volatilization of the organic solvent from the coating film will be so slow that there will be difficulty in the workability. Further, when irradiated with active energy rays the evaporation and escape of the remaining organic solvent and the formation of the cross-linked hardened film caused by the polymerization will not be balanced with each other, thus the uniformity and surface smoothness of the cross-linked hardened film will be lost or the organic solvent will remain in the cross-linked hardened film to whiten the film. For these reasons it is necessary therefore that the boiling point of the organic solvent should be 50° to 200° C. or preferably about 60° to about 150° C. under atmospheric pressure.

It is also necessary that the viscosity of the organic solvent incorporated in the formulation should not be higher than 10 centipoises for when it exceeds 10 centipoises, the viscosity of the coating composition becomes so high that the paintability and cross-linked hardened film performance are poor.

The amount of use of the organic solvent used is preferably about 95 to about 10 parts by weight per 5 to 90 parts by weight of the monomer mixture (A) as described above, and the total of the monomers plus solvent is 100 parts by weight. The correct ratio as between organic solvent and monomer mixture depends upon several factors including the nature of the monomers and their interaction with each other, the viscosity of the liquid, the undried coating composition and physical properties of the resulting coating as well as the substrate to which the coating is applied. Following the teachings herein, possibly with only minor experimentation, the skilled operator will select the proper ratio. When the organic solvent content is less than 10 parts by weight, the viscosity of the coating composition will be so high that its ability to properly coat or paint a surface will be low, the thickness of the coating film will be difficult to control, a non-uniform film formation is likely to occur and even the adhesion of the cross-linked hardened film to the base material will be reduced under severe conditions. On the other end of the scale, if the organic solvent content should exceed 95 parts by weight, the thickness of the cross-linked hardened film will be difficult to control, surface smoothness will be lost and abrasion resistance will be reduced.

Depending on the article on which the cross-linked hardened film is to be formed, the surface smoothness of the cross-linked hardened film may be required to be very high or the flexibility and thinness of the film may be required. Therefore, it is very important in practice to adjust the viscosity of the coating composition to maximize the painting workability and the uniformity of the film coating and to make it easy to control the film thickness. In order to accomplish this the viscosity of the coating is conveniently controlled by adjusting the mixing rates of the respective component monomers in the monomer mixture and the amount of the organic solvent incorporated therein as well as to select the appropriate method of forming the film according to the purpose for which the coating is applied.

The organic solvent used in the coating compositions according to the present invention must satisfy the above described conditions. As specific materials there may be mentioned alcohols such as ethanol, isopropanol, normal propanol, isobutylalcohol and normal butylalcohol; aromatic hydrocarbons such as benzene, toluene, xylene and ethylbenzene; ketones such as acetone and methylethylketone; ethers such as dioxane, acid esters such as ethyl acetate, n-butyl acetate and ethyl propionate and N,N'-dimethyl-formamide. Any one of these organic solvents may be used alone or two or more of them may be used in mixtures provided that the boiling point and component rates of the mixture fall within the above requirements.

One may also use a polymerizable monomer such as methyl acrylate, ethyl acrylate, methyl methacrylate or styrene as an organic solvent if, for example, the use of the monomer has a specific object for its inclusion, satisfies the same conditions as other organic solvents and has the same results.

The coating compositions of the present invention are particularly suited for application to synthetic resin substrates or surfaces, most notably the polycarbonates, polymethyl methacrylates and polyallyldiglycol carbonate, however, other substrates may be used.

Depending on the particular type of synthetic resin used as the base material, the organic solvent component of the coating composition may cloud the resin used as the substrate and cause it to become translucent when previously it was transparent. Also a given solvent system may dissolve the dyeing pigment out of a colored base material and discolor the resin or may cause the synthetic resin substrate to crack. Therefore, it is preferred that the organic solvent system be properly selected and used in response to the type of base material on which the cross-linked hardened film is to be formed or the object of the coating procedure. The skilled operator will be able to quickly determine the suitability of a given solvent system based on a few experiments.

In order to apply the coating composition to paint or coat the surface of a synthetic resin molding to form a cross-linked hardened film thereon, it is necessary to irradiate the applied composition with active energy rays such as ultraviolet rays, electron rays or radioactive rays. We prefer irradiation with ultraviolet rays for most situations as it is convenient to carry out in practice.

When using ultraviolet rays as the energy rays for cross-linking and hardening the coating film, it is necessary to add into the coating composition a photosensitizing agent (C) which serves to initiate a polymerization reaction upon incidence of the ultraviolet ray irradiation. Specific examples of suitable photosensitizing agents include the carbonyl compounds such as benzoin, benzoin methylether, benzoin ethylether, benzoin isopropylether, acetoin, butyloin, toluoin, benzil benzophenone, p-chlorobenzophenone and p-methoxybenzophenone; sulfur compounds such as tetramethylthiulum monosulfide and tetramethylthiulum disulfide; azo compounds such as azobisisobutylonitrile and azobis-2,4-dimethylvaleronitrile; and peroxide compounds such as benzoyl peroxide and ditertiary butyl peroxide. Any of these or similar photosensitizing agents may be used alone or two or more of them may be used in combination.

The amount of photosensitizing agent or agents included in the coating composition is up to about 10 parts by weight, and preferably about 0.01 to about 10 parts by weight calculated on the basis of 100 parts by weight of the total monomer mixture (A) and organic solvent (B). When the amount of photosensitizing agent added is too large the formed cross-linked, hardened film will be colored and its ability to withstand weather, particularly sunlight, will be reduced.

It will be understood that other additives, dyes, pigments, processing aids, stabilizers and the like, to name but a few, may be added to the coating compositions without departing from the spirit and scope of our invention as we envision it. For instance, additives such as a surface smoothing agent, surface active agent, ultraviolet ray absorbing agent or storage stabilizing agent can be properly added, as may be required in accordance with experience and contemporary practice, to the coating compositions used in the present invention.

The abrasion resistant synthetic resin molding is made according to the method aspect of the present invention by using the above described coating composition and applying the coating composition to the surface of the synthetic resin molding or article and thereafter irradiating the coated article with active energy rays.

There are a number of particularly attractive articles onto which the coating compositions of the present invention are well suited. Some specific examples of the synthetic resin moldings used to make the synthetic resin molding high in the abrasion resistance, surface smoothness and antistaticity by using the coating composition of the present invetion are various thermoplastic and thermosetting synthetic resins moldings, such as sheet-shaped moldings such as glass plates and reflectors, injection moldings such as lighting fixture covers, film-shaped moldings, rod-shaped moldings, and lens moldings made of all types of synthetic plastics-type resins, most notably polymethyl methacrylate, polycarbonate, polyallyldiglycol carbonate, polystyrene, acrylonitrilestyrene copolymer (AS resins), polyvinyl chloride, acetate, acrylonitrilebutadiene styrene resins (ABS resins) and polyester.

Among these materials, the articles made of polymethyl methacrylate, polycarbonate and polyallyldiglycol carbonate are frequently used for their excellent optical properties, resistance to heat and to shock. Various other end uses and applications will be readily apparent to the reader. These types of moldings and articles can be used not only as they are but also, as required, they can be pretreated with etching procedures, corona discharge, active energy ray irradiation, dyeing or printing.

Any convenient method can be used to apply the coating compositions to the desired article substrate. Methods such as brush painting, flow painting, spray painting, rotation painting or dip painting are used for applying the above described coating composition to the synthetic resin molding. Of these procedures we prefer to dip painting method which is simple and convenient in operation and is relatively low in loss of the coating composition. The dip method is thus preferable in respect of both workability and productivity.

The amount of thickness of the coating composition depends on several factors, perhaps the two most important being the amount of polymerizable available in the coating composition and the desired end use for which the article is intended. Thus, the amount of the coating composition applied to the surface of the synthetic resin molding should be applied so that the thickness of the cross-linked hardened film formed on the surface of the synthetic resin molding will be in the range of at least 1 up to about 30 or so microns. The amount of the coating composition required to achieve this range can be from a thickness of 15 to 300 microns in the uncured state.

These parameters are chosen for the following reasons: If the thickness of the cross-linked hardened film formed on the surface of the synthetic resin molding is less than 1 micron, the abrasion resistance will be unacceptably reduced for most uses, while in cases where it exceeds 30 microns the hardened film will be reduced in flexibility and thus will be prone to crack and therefore the molding itself will be reduced in the strength.

In order to cross-link and harden the applied film, it must be irradiated with active energy rays such as ultraviolet rays emitted from such light source as a xenon lamp, a low voltage mercury lamp, a high voltage mercury lamp or ultrahigh voltage mercury lamp, electron rays taken usually out of an electron ray accelerator of 20 to 2000 KV or such radioactive rays as alpha, beta or gamma rays from suitable sources.

The atmosphere in which the coating composition is irradiated with active energy rays may be an inert gas atmosphere as nitrogen or carbon dioxide, or an atmosphere in which the oxygen concentration is reduced below that of ambient air. However, even in an ordinary air atmosphere, the coating composition according to the present invention can form a cross-linked hardened film high in the abrasion resistance and the other desirable characteristics as described in detail above. The irradiating atmosphere temperature may be the normal or room temperature of about 20° C. or it may be elevated provided that the temperature is not so high as to detrimentally deform the base material synthetic resin molding.

The synthetic resin molding made by using the coating composition of the present invention which has a cross-linked hardened film on the surface is high in surface smoothness and fine appearance and further is very high in the surface hardness, abrasion resistance and scratch resistance. In addition, the hardened film formed on the surface of the substrate is high in antistaticity and cloud prevention, will not deposit dust at all on itself or when induced by rubbing and will not develop undesirable cloudiness even when exposed to humid air. The cross-linked hardened film in which the phosphoric acid ester-type monomer and ethanolamine-type compound are not mixed is difficult to dye irrespective of the type of dye used. However, the hardened film of the present invention can be conveniently dyed with almost all types of dyes. It is particularly adapted to be dyed with a basic dye having an amine salt or quaternary ammonium base or a nitro, azo, anthraquinone or aminoketone type dispersed dye. In the latter case a cation, anion, nonion or amphoteric ion-type surface active agent can be used as a dispersing agent and a chlorobenzene, methylnaphthalene, o-phenylphenol, aromatic ether or alkyl salicylate type compound can be used as a carrier. A host of commercially available dyes and pigments may be included in the coating composition and only a few of these are mentioned herein by way of illustration.

The cross-linked hardened film of the present invention is high also in adhesion to the base material and thus exhibiting this property it is very useful for applications such as organic window glass plates, lighting fixture covers and diffusers, reflectors, eyeglass lenses, sun glass lenses and optical lenses.

EXAMPLES OF THE INVENTION

The present invention will now be described in more detail with reference to the following non-limiting examples. In these examples, the measurements and evaluations were made by the following procedures and test methods:

(1) Abrasion resistance:
 (a) Surface hardness—Pencil hardness according to JIS K5651-1966.
 (b) Rubbing test—Rubbing test with #000 steel wool.
  o = the surface was not substantially scratched when lightly rubbed.
  Δ = the surface was only slightly scratched when lightly rubbed.
  x = the surface was severaly scratched (to the same degree as the base material resin) when lightly rubbed.
(2) Adhesion:
 A cross-cut cellophane tape peeling test was used to test the cross-linked hardened film. According to this procedure 11 film cutting lines extending from the film surface to the base material were made at intervals of 1 mm. in both the longitudinal and lateral directions on the film. This resulted in 100 mesh squares. A strip of cellophane tape was secured to the mesh squares, then was quickly peeled off. In this operation the cellophane tape was applied 3 times in the same place.
  o = when repeated 3 times, no mesh of the cross-linked hardened film was peeled off.
  Δ = when repeated 3 times, 1 to 50 mesh squares were peeled off.
  x = when repeated 3 times, 51 to 100 mesh squares were peeled off.
(3) Surface smoothness measurement:
  o = the smoothness of the surface of the film was so high as to be considered a mirror surface.
  Δ = the surface smoothness of the film was high, but was delicately disordered and could not be considered to be of a mirrolike surface.
  x = the surface was disordered and was hardly smooth.
(4) Antistaticity:
 (a) Cigarette ash deposition test:
  o = after the surface of the hardened film was rubbed 20 times with a cotton cloth then brought within about 1 cm. of a fresh cigarette ash, no ash was deposited.
  Δ = using the same procedures as above some ash was deposited.
  x = using the same procedure as above a substantial amount of ash was deposited.
 (b) Measuring the period of the half reduction of staticity: After the same was maintained at a constant temperature of 20° C. under a constant relative humidity of 60% for 24 hours, the period of the half reduction of a staticity was measured using an Honest Meter manufactured by Shishido Shokai Co. with an impressed voltage of 10 K.V. for 10 seconds.
(5) Cloud prevention of cloudiness:

o = when the breath was blown onto the sample for 10 seconds which was maintained for 24 hours at a temperature of 20° C. at a relative humidity of 60%, the surface was not clouded at all.

Δ = using the same operation as above, the surface was slightly clouded.

x = using the same operation as above, the surface was substantially clouded.

In the following Examples those in accordance with the present invention are designated with a numeral while those presented for purposes of comparison are indicated with a letter.

dyeability. As compared with this, in a similar composition in which the ethanol-amine-type compound was not mixed with the phosphoric acid ester type monomer as in Example A, the film was high in abrasion resistance and adhesion properties but was low in antistaticity and was not dyed at all with a basic dye.

Further, it is found that, as shown by Example B, in the composition in which another trifunctional acrylate was used rather than that of the present invention was used, even when the composition was irradiated with ultraviolet rays in air, it did not become thoroughly cross-linked and hardened.

TABLE 1

| Experiment No. | Composition of Coating Solution (w. t. parts) (in parts by weight) | | Organic Solvent (B) | Photosensitizer (C) | Coating Film Formation | Smoothness of Hardened Film |
|---|---|---|---|---|---|---|
| | Monomer Mixture (A)*1 | | | | | |
| A (Control) | 2P5A<br>THF-A | 27.3<br>9.1 | Isopropanol 54.5<br>Toluene 9.1 | BEE<br>1.8 | Favorable | 0 |
| 1 (Example) | 2P5A<br>THF-A<br>MEP<br>REA | 22.8<br>7.6<br>4.6<br>1.4 | Isopropanol 54.5<br>Toluene 9.1 | BEE<br>1.8 | Favorable | 0 |
| B (Control) | TMPTA<br>2-EHA<br>MEP<br>REA | 22.8<br>7.6<br>4.6<br>1.4 | Isopropanol 54.5<br>Toluene 9.1 | BEE<br>1.8 | Favorable | Not Hardened |

| Experiment No. | Thickness Of Hardness (Microns) | Abrasion Resistance | | Adhesion | Antistaticity | | Dyeability*2 |
|---|---|---|---|---|---|---|---|
| | | Pencil Hardness | Steel Wool | | Half-Reduction Period (sec) | Cigarette Ash Test | |
| A (Control) | 3.4 | 7H | 0 | 0 | 180< | x | Not dyed at all |
| 1 (Example) | 3.5 | 7H | 0 | 0 | 1.1 | 0 | Dyed, deeply, uniformly |
| B (Control) | Did not harden | | | | | | |

*1 2P5A = dipentaerythritol pentacrylate
THF-A = tetrahydrofurfuryl acrylate
MEP = methacryloxyethyl phosphate
REA = N-lauryldiethanolamine
TMPTA = trimethylolpropane triacrylate
2-EHA = 2-ethylhexyl acrylate
BEE = benzoethylether

*2 Dyeing conditions
Deolene Blue 5G (produced by Ciba Geigy Co., a Basic dye)   5 parts by weight
Acetic acid   0.5 part by weight
Sodium acetate   0.5 part by weight
Deionized water   100 parts by weight
Temperature   90° C.
Time of contact with dye solution   1 hour

EXAMPLE 1 AND COMPARATIVE EXAMPLES A AND B

A coating solution of the composition as is shown in Table 1 was prepared and a methacrylic resin plate (identified by the trademark Acrylite and produced by Mitsubishi Rayon Company, Ltd.) 2 mm thick was dipped into the coating solution and was pulled out of the coating solution at a speed of 0.5 cm./sec. to form a film. After being left to stand as it was for 10 minuts, the plate coated with the coating composition was irradiated in air for 15 seconds with ultraviolet rays from a high voltage mercury lamp (2 K.W. HO-L 21 manufactured by Iwasaki Electric Co.) from a distance of 20 cm. on each surface of the plate. The results obtained are shown in Table 1.

As shown by Example 1, the composition of the present invention was cross-linked and hardened even in air to form a highly desirable film and gave high performance in abrasion resistance, adhesion, antistaticity and

EXAMPLE 2 AND COMPARATIVE EXAMPLES C AND D

A methacrylic resin plate 2 mm in thickness was dipped into a coating solution having the composition as is shown in Table 2 and was pulled out of the solution at a speed of 0.5 cm./sec. to form a film on the resin plate. After allowing the thus-dipped plate to stand for 10 minutes, the plate was irradiated in air for 15 seconds with ultraviolet rays from a high voltage mercury lamp from a distance of 20 cm. on each surface of the plate. The results obtained are shown in Table 2.

The coating composition of Example 2 of the present invention had a viscosity of the monomer mixture (A) not greater than 1000 centipoises at 20° C. showed overall high performance properties. However, the compositions of Comparative Examples C and D in which the viscosity exceeded 1000 centipoises were low in the smoothness values of the hardened film, were dyeable with the dye solution but were low in thickness uniformity.

EXAMPLES 3-5 AND COMPARATIVE EXAMPLES E-J

A coating solution was prepared as shown in Table 3 in which the amounts of methacryloxyethyl phosphate (MEP) and N-lauryldiethanolamine (REA) were varied. A methacrylic resin plate 21 mm in thickness was dipped into this solution and was pulled out at a rate of 0.5 cm./sec. to form a film on the plate. After allowing the dipped and coated plate to stand as it was for 10 minutes, the plate was irradiated in air for 15 seconds with ultraviolet rays from a high voltage mercury lamp from a distance of 20 cm. on each surface of the plate. The results obtained are given in Table 3.

When only MEP or REA was added the antistatic and dyeability properties were low, and even when MEP and DERA were mixed and used at rates outside the range of the present invention, performance values were low or no balance was obtained to satisfy all the performance requirements.

TABLE 2

| Experiment No. | Composition of Coating Solution (in parts by weight)*1 Monomer Mixture (A) | | Viscosity of Monomer Mixture (A) | Viscosity of Coating Composition | Smoothness of Hardened Film | Thickness of Hardened Film |
|---|---|---|---|---|---|---|
| 2 (Example) | 2P5A<br>2EPP2A<br>THF-A<br>MEP<br>REA | 20.5<br>3.8<br>6.1<br>4.6<br>1.4 | 560 centipoises/20° C. | 5.4 centipoises/20° C. | o | 3.4 |
| C (Control) | 2P5A<br>2EPP2A<br>14EDA<br>MEP<br>REA | 20.5<br>3.8<br>6.1<br>4.6<br>1.4 | 1210 centipoises/20° C. | 6.3 centipoises/20° C. | Δ | 4.0 |
| D (Control) | 2P5A<br>2EPP2A<br>MEP<br>REA | 26.5<br>3.8<br>4.6<br>1.5 | 3455 centipoises/20° C. | 6.9 centipoises/20° C. | x | 3.9 |

| Experiment No. | Abrasion Resistance | | Adhesion | Cigarette Ash Test | Half-Reduction Period (sec) | | Dyeability*2 |
|---|---|---|---|---|---|---|---|
| | Pencil Hardness | Steel Wool | | | Before Dyeing | After Dyeing | |
| 2 (Example) | 7H | o | o | o | 0.9 | 1.0 | Dyed, deeply and uniformly |
| C (Control) | 7H | o | o | o | 1.1 | 0.9 | Dyed, deeply but somewhat non-uniformly |
| D (Control) | 7H | o | Δ | o | 1.2 | 1.2 | Dyed, deeply but non-uniformly |

*¹2EPP2A = 2,2-bis(4-acryloxydiethoxyphenyl)propane.
14EDA = Polyethyleneglycol diacrylate. (The ring opening polymerization degree of ethylene oxide was 14 on the average.)
The amounts of the organic solvents added to the coating composition were 54.5 parts by weight of isopropanol and 9.1 parts by weight of toluene in each Example. The amount of the photosentisizing agent added to the coating composition was 1.8 parts by weight of benzoin ethylether in each Example.
The reactants are otherwise identified in the same manner as in Table 1.
*²The dyeing conditions were the same as in Example 1.

TABLE 3

| Experiment No. | Composition of Coating Solution (in parts by weight) | | | | | | Photosensitizer (C) |
|---|---|---|---|---|---|---|---|
| | Monomer Mixture (A) | | | | Organic Solvent (B) | | |
| | 2P5A | THF-A | MEP | REA | Isopropanol | Toluene | BEE |
| E (Control) | 23.7 | 7.9 | 4.8 | 0 | 54.5 | 9.1 | 1.8 |
| F (Control) | 26.0 | 8.7 | 0 | 1.7 | 54.5 | 9.1 | 1.8 |
| G (Control) | 25.8 | 8.6 | 0.3 | 1.7 | 54.5 | 9.1 | 1.8 |
| Example 3 | 24.8 | 8.3 | 1.7 | 1.6 | 54.5 | 9.1 | 1.8 |
| Example 4 | 23.7 | 7.9 | 3.2 | 1.6 | 54.5 | 9.1 | 1.8 |
| Example 5 | 21.8 | 7.3 | 5.8 | 1.5 | 54.5 | 9.1 | 1.8 |
| H (Control) | 20.2 | 6.7 | 8.1 | 1.4 | 54.5 | 9.1 | 1.8 |
| I (Control) | 23.5 | 7.9 | 4.7 | 0.3 | 54.5 | 9.1 | 1.8 |
| J (Control) | 21.0 | 7.0 | 4.2 | 4.2 | 54.5 | 9.1 | 1.8 |

| Experiment No. | Appearance of Hardened Film | | Steel Wool | | Cigarette Ash Test | Half-Reduction Period (sec) | | Dyeability*1 |
|---|---|---|---|---|---|---|---|---|
| | Smoothness | Transparency | Hardness | Adhesion | | Before Dyeing | After Dyeing | |
| E (Control) | o | Slightly clouded | o | Δ | Δ | 13.5 | 21.4 | Dyed non-uniformly |
| F (Control) | o | High | o | o | x | 180< | 180< | Not dyed |

TABLE 3-continued

| | | | | | | | | |
|---|---|---|---|---|---|---|---|---|
| G (Control) | o | High | o | o | Δ | 7.4 | 10.2 | Very slightly dyed |
| Example 3 | o | High | o | o | o | 2.3 | 2.4 | Dyed, deeply uniformly |
| Example 4 | o | High | o | o | o | 1.4 | 1.4 | Dyed, deeply uniformly |
| Example 5 | o | High | o | o | o | 0.6 | 0.5 | Dyed, deeply uniformly |
| H (Control) | Δ | Clouded | Δ | Δ | o | 0.5 | 0.5 | Dyed, deeply uniformly |
| I (Control) | o | Slightly Clouded | o | o | Δ | 10.2 | 9.3 | Dyed, deeply uniformly |
| J (Control) | x | Slightly Clouded | x | x | o | 0.8 | 0.9 | Dyed, deeply but non-uniformly |

*[1] The dyeing conditions were the same as in Example 1.

EXAMPLES 6–10 AND COMPARATIVE EXAMPLES K–N

Next, the various types of the phosphoric acid ester type monomer and alkylamine in the coating were investigated in these Examples in which the coating solution of Example 4 was reproduced and varied using the method of Example 3. The preformance values of the resulting hardened film were evaluated.

As evident from Table 4, even when the phosphoric acid ester-type monomer having no (meth)acryloxy group and the alkylamine having no $CH_2CH_2OH$ group were mixed and used in the amount indicated, the effect of the present invention was not obtained; rather only a film low in the antistaticity and dyeability was obtained. Further, in the case of N-hexadecyldiethanolamine which is an alkylamine having a $CH_2CH_2OH$ group but having more than 15 carbon atoms in the alkyl group, the solubility reduced, the smoothness and transparency of the hardened film were reduced and no satisfactory antistaticity was obtained.

EXAMPLES 11 AND 12 AND COMPARATIVE EXAMPLES O–Q

A coating solution in which the amounts of methacryloxyethyl phosphate (MEP) and N-lauryldiethanolamine (REA) induced therein were varied was prepared as described in Table 5 according to the metod of Example 4 to make a hardened film and the film performance values were evaluated. The results obtained are shown in Table 5.

The solutions containing no MEP or REA or both were low in antistatic and dyeability properties and the films are not dyed at all, particularly with a dispersed dye. On the other hand, it is evident that the composition of the present invention in which MEP and REA are both used in the amounts indicated shows uniformly high performances and is dyed deeply and uniformly with either a basic dye or a dispersed dye.

TABLE 4

| Experiment No. | Type of Monomer | | Appearance of Hardened Film | |
|---|---|---|---|---|
| | Phoshoric Acid Ester Monomer | Alkylamine | Smoothness | Transparency |
| Example 6 | Acryloxyethyl phoshate | Diethanol-laurylamine | o | High |
| Example 7 | Diacryloxyethyl phosphate | Diethanol-laurylamine | o | " |
| Example 8 | Dimethacryloxyethyl phosphate | Diethanol-laurylamine | o | " |
| K (Control) | Bis(2-chloroethyl)vinyl phosphate | Diethanol-laurylamine | Δ | Slightly Clouded |
| L (Control) | 3-chloro-2-acid phosphoxypropyl methacrylate | Diethanol-laurylamine | Δ | Slightly Clouded |
| M (Control) | Methacryloxyethyl phosphate | Triethylamine | o | High |
| Example 9 | Methacryloxyethyl phosphate | Diethanolamine | o | " |
| Example 10 | Methacryloxyethyl phosphate | N-propyldiethanol-amine | o | " |
| N (Control) | Methacryloxyethyl phosphate | N-hexadecylethanol-amine | x | Clouded |

| Experiment No. | Steel Wool Hardness | Adhesion | Cigarette Ash Test | Half-Reduction Period (sec) | | Dyeability*[1] |
|---|---|---|---|---|---|---|
| | | | | Before Dyeing | After Dyeing | |
| Example 6 | o | o | o | 1.6 | 1.7 | Uniformly dyed |
| Example 7 | o | o | o | 2.1 | 2.3 | " |
| Example 8 | o | o | o | 1.9 | 2.2 | " |
| K (Control) | o | o | x | 180< | 180< | Very slightly dyed |
| L (Control) | o | Δ | x | 180< | 180< | Dyed non-uniformly |
| M (Control) | o | o | Δ | 32.5 | 28.9 | Dyed, deeply, |

TABLE 4-continued

| | | | | | | |
|---|---|---|---|---|---|---|
| Example 9 | o | o | o | 1.2 | 1.3 | uniformly Dyed, deeply, uniformly |
| Example 10 | o | o | o | 1.1 | 1.1 | Dyed, deeply, uniformly |
| N (Control) | o | Δ | Δ | 21.1 | 24.5 | Dyed, deeply but non-uniformly |

*[1] The dyeing method was the same as in Example 1.

TABLE 5

| | Composition of Coating Solution (in parts by weight) | | | | | | | | Appearance of Hardened Film | |
|---|---|---|---|---|---|---|---|---|---|---|
| | | | | | Organic Solvent (B) | | Photosensitizer (C) | | | |
| Experiment No. | Monomer Mixture (A) | | | | Isopropanol | Toluene | BEE | | Smoothness | Transparency |
| | 2P5A | THF-A | MEP | REA | | | | | | |
| O (Control) | 29.1 | 7.3 | 0 | 0 | 54.5 | 9.1 | 1.8 | | o | High |
| P (Control) | 25.3 | 6.3 | 4.8 | 0 | 54.5 | 9.1 | 1.8 | | o | Slightly Clouded |
| Q (Control) | 27.7 | 6.9 | 0 | 1.8 | 54.5 | 9.1 | 1.8 | | o | High |
| Example 11 | 24.3 | 6.1 | 4.6 | 1.4 | 54.5 | 9.1 | 1.8 | | o | " |
| Example 12 | 23.3 | 5.8 | 4.4 | 2.9 | 54.5 | 9.1 | 1.8 | | o | " |

| Experiment No. | Steel Wool Hardness | Adhesion | Antistaticity | | Dyeability *[1] | |
|---|---|---|---|---|---|---|
| | | | Cigarette Ash Test | Half-Reduction Period (sec) | A | B |
| O (Control) | o | o | x | 180< | Not dyed at all | Not dyed at all |
| P (Control) | o | Δ | Δ | 15.1 | Non-uniformly dyed | Not dyed at all |
| Q (Control) | o | o | x | 180< | Very slightly dyed | Not dyed at all |
| Example 11 | o | o | o | 1.3 | Dyed, deeply, uniformly | Dyed, deeply, uniformly |
| Example 12 | o | o | o | 1.1 | Dyed, deeply, uniformly | Dyed, deeply, uniformly |

*[1] Dyeing Conditions:
A. The same as in Example 1.
B. Dianix Blue BG-FS (produced by Mitsubishi Chemical Co., a dispersed dye) — 5 parts by weight
Disper TL (produced by Meisei Chemical Co.) — 3 parts by weight
Methyl salicylate — 1 part by weight
Deionized water — 100 parts by weight
Temperature — 90° C.
Time of contact with the sample hardened film — 1 hour

EXAMPLE 13

A hardened film was prepared by using the coating solution of Example 1 in the same manner as in Table 1 and coated on a polycrbonate resin plate (identified by the trademark Upilon and produced by Mitsubishi Gas Chemical Co.) having a thickness of 3 mm. The performance of the coating was investigated and the hardened film was found to be smooth, 3.1 microns in thickness, had a pencil hardness of 6H, was not scratched in the steel wool test and exhibited high adhesion. The half-reduction period was 0.9 second. No cigarette ash was deposited and the coating could be dyed deeply and uniformly.

EXAMPLE 14

Performance characteristics of a hardened product treated in the same manner as in Example 13 except this time using a lens blank (a CR-39 lens blank) having a diameter of 8 cm. and thickness of 2 mm. made of polyallyldiglycol carbonate were investigated. The film coating was smooth, favorable in the appearance, had a pencil hardness of 7H, was not scratched in the steel wool test and exhibited high adhesion. The half-reduction period was 1.0 second and no cigarette ash was deposited in the antistatic test. The coated lens could be dyed to be deep and uniform.

EXAMPLE 15

The method of Example 14 was repeated by using a lens blank having a diameter of 8 cm. and thickness of 2 mm. made of polymethyl methacrylate. The hardened film of the product obtained was fully acceptable and exhibited the same performance characteristics as in Example 14.

EXAMPLE 16

A series of coating solutions each having the composition as shown in Table 6 were prepared. A methacrylic resin plate having a thickness of 2 mm. was dipped in this solution and was removed from the solution at a speed of 0.5 cm./sec. to form a film on the plate. After being allowed to stand as it was for 10 minutes, the plate coated with the coating composition was irradiated in air for 15 seconds with ultraviolet rays of a high voltage mercury lamp from a distance of 20 cm. on each surface of the plate. The results obtained are given in Table 6.

As shown in Example 16, the coating composition of the present invention forms fully acceptable cross-linked hardened film when irradiated in air. The film was uniformly excellent performance characteristics not only in abrasion resistance, smoothness and adhesion but also in the properties of cloud prevention, antistaticity and dyeability.

In comparison with Example 16, in Comparative Examples R, S and T, in the coating solution not containing polyethyleneglycol (meth)acrylate, or either of the phosphate-type monomer and ethanolamine-type compound, the abrasion resistance, smoothness and adhesion are high but no film is obtained that satisfies all of the cloud prevention, antistaticity and dyeability requirements.

Comparative Example U shows that in the solution using a trifunctional acrylate other than that required by the present invention, even if the film is irradiated with ultraviolet rays in air, it does not become cross-linked and hardened.

high voltage mercury lamp from a distance of 20 cm. on each surface of the plate. The results obtained are shown in Table 7. Both experiments are according to the invention and show that the products thus obtained had favorable performance characteristics.

EXAMPLES 19–26 AND COMPARATIVE EXAMPLES V–Y

A series of coating solutions in which the identity and amount of the polyethyleneglycol ester were varied as is shown in Table 8 were prepared according to the method of Example 1 to make a hardened film on a methacrylic test plate. The performance characteristics of the products so obtained were evaluated and the results reported in Table 8 as well.

As evident from Table 8, it is found to be undesirable that, when the ring opening polymerization degree of the polyoxyethylene was so small as to be $n=4$, the cloud preventing properties will be low and when the value is as large as $n=32$, while the cloud prevention is high the abrasion resistance, smoothness and adhesion values are all reduced.

Similarly, when the amount of the polyethyleneg-

TABLE 6

| | Composition of Coating Solution (in parts by weight) | | | | | | | | |
|---|---|---|---|---|---|---|---|---|---|
| | Monomer Mixture (A) | | | | | | Organic Solvent (B) | | Photosensitizer (C) |
| Experiment No. | 2P5A | TMPTA | THF-A | 23G*[1] | MEP | REA | Isopropanol | Toluene | BEE |
| Example 16 | 22.8 | 0 | 3.8 | 3.8 | 4.6 | 1.4 | 54.5 | 9.1 | 1.8 |
| R (Control) | 27.3 | 0 | 9.1 | 0 | 0 | 0 | 54.5 | 9.1 | 1.8 |
| S (Control) | 27.3 | 0 | 4.6 | 4.5 | 0 | 0 | 54.5 | 9.1 | 1.8 |
| T (Control) | 22.8 | 0 | 7.6 | 0 | 4.6 | 1.4 | 54.5 | 9.1 | 1.8 |
| U (Control) | 0 | 25.4 | 0 | 4.2 | 5.1 | 1.7 | 54.5 | 9.1 | 1.8 |

*[1]23G Polyethyleneglycol dimethacrylate (n = 23).

| Experiment No. | Smoothness of Hardened Film | Thickness of Hardened Film (Microns) | Abrasion Resistance Pencil Hardness | Steel Wool | Adhesion | Cloud Prevention | Cigarette Ash Test | Half-Reduction Period (sec) | Dyeability *[2] |
|---|---|---|---|---|---|---|---|---|---|
| Example 16 | o | 3.7 | 7H | o | o | o | o | 1.0 | Dyed, deeply, uniformly |
| R (Control) | o | 3.6 | 7H | o | o | x | x | 180< | Not dyed |
| S (Control) | o | 3.6 | 7H | o | o | x | x | 180< | Slightly dyed |
| T (Control) | o | 3.5 | 7H | o | o | x | o | 1.1 | Dyed, deeply, uniformly |
| U (Control) | Not Hardened | — | — | — | o | — | — | — | — |

*[2]The conditions were the same as in Example 1.

EXAMPLES 17 AND 18

A methacrylic resin plate having a thickness of 2 mm. was dipped in a coating solution having the composition as shown in Table 7 and was pulled out of the solution at a speed of 0.5 cm./sec. to form a film. After being allowed to stand as it was for 10 minutes, the plate was irradiated in air for 15 seconds with ultraviolet rays of a lycol ester used is too small, the cloud preventing properties are low and when it is too large, the smoothness, abrasion resistance and adhesion will be reduced.

Additionally, it appears that the antistaticity and dyeability are uniformly high irrespective of the identity and amount of the polyethyleneglycol ester and that only the cloud prevention characteristics are influence.

TABLE 7

| | Composition of Coating Solution (in parts by weight) | | | | | | | | |
|---|---|---|---|---|---|---|---|---|---|
| | Monomer Mixture (A) | | | | | | Organic Solvent (B) | | Photosensitizer (C) |
| Experiment No. | 2P5A | THF-A | 9G*[1] | 23G | MEP | REA | Isopropanol | Toluene | BEE |

TABLE 7-continued

| Example 17 | 24 | 7 | 0 | 8.9 | 5.3 | 1.8 | 44.2 | 8.8 | 1.8 |
| Example 18 | 24 | 7 | 8.9 | 0 | 5.9 | 1.9 | 44.2 | 8.8 | 1.8 |

*¹9G Polyethylene glycol dimethacrylate (n = 9)

| Experiment No. | Smoothness of Hardened Film | Thickness of Hardened Film (Microns) | Abrasion resistance (Steel Wool) | Adhesion | Cloud Prevention | Cigarette Ash Test | Half-Reduction Period (sec) | Dyeability*² |
|---|---|---|---|---|---|---|---|---|
| Example 17 | 0 | 3.6 | 0 | 0 | 0 | 0 | 1.0 | Dyed, deeply, uniformly |
| Example 18 | 0 | 3.7 | 0 | 0 | 0 | 0 | 1.0 | Dyed, deeply, uniformly |

*²The conditions were the same as in Example 1.

TABLE 8

| | Composition of Coating Solution (in parts by weight) | | | | | | | |
|---|---|---|---|---|---|---|---|---|
| | | | | | | Organic Solvent (B) | | Photosensitizer (C) |
| Experiment No. | 2P5A | THF-A | MEP | REA | Polyethyleneglycol ester | Isopropanol | Toluene | BEE |
| V (Control) | 22.8 | 3.8 | 4.6 | 1.4 | Dimethacrylate (n = 4) 3.8 | 54.5 | 9.1 | 1.8 |
| Example 19 | 22.8 | 3.8 | 4.6 | 1.4 | Dimethacrylate (n = 6) 3.8 | 54.5 | 9.1 | 1.8 |
| Example 20 | 22.8 | 3.8 | 4.6 | 1.4 | Monomethacrylate (n = 9) 3.8 | 54.5 | 9.1 | 1.8 |
| Example 21 | 22.8 | 3.8 | 4.6 | 1.4 | Dimethacrylate (n = 9) 3.8 | 54.5 | 9.1 | 1.8 |
| Example 22 | 22.8 | 3.8 | 4.6 | 1.4 | Monomethacrylate (n = 4) 3.8 | 54.5 | 9.1 | 1.8 |
| Example 23 | 22.8 | 3.8 | 4.6 | 1.4 | Dimethacrylate (n = 14) 3.8 | 54.5 | 9.1 | 1.8 |
| Example 24 | 22.8 | 3.8 | 4.6 | 1.4 | Monomethacrylate (n = 23) 3.8 | 54.5 | 9.1 | 1.8 |
| W. (Control) | 24.8 | 4.1 | 5.0 | 1.7 | Dimethacrylate (n = 23) 0.8 | 54.5 | 9.1 | 1.8 |
| Example 25 | 23.7 | 4.0 | 4.7 | 1.6 | Dimethacrylate (n = 23) 2.4 | 54.5 | 9.1 | 1.8 |
| Example 26 | 20.6 | 3.4 | 4.1 | 1.4 | Dimethacrylate (n = 23) 6.9 | 54.5 | 9.1 | 1.8 |
| X (Control) | 14.6 | 2.4 | 2.9 | 1.0 | Dimethacrylate (n = 23) 15.5 | 54.5 | 9.1 | 1.8 |
| Y (Control) | 22.8 | 3.8 | 4.0 | 1.4 | Dimethacrylate (n = 32) 3.8 | 54.5 | 9.1 | 1.8 |

| Experiment No. | Smoothness of Hardened Film | Abrasion Resistance (Steel Wool) | Adhesion | Cloud Prevention | Cigarette Ash Test | Half-Reduction Period (sec) | Dyeability *¹ |
|---|---|---|---|---|---|---|---|
| V (Control) | 0 | 0 | 0 | x | 0 | 1.3 | Dyed, deeply, uniformly |
| Example 19 | 0 | 0 | 0 | 0 | 0 | 1.1 | Dyed, deeply, uniformly |
| Example 20 | 0 | 0 | 0 | 0 | 0 | 1.2 | Dyed, deeply, uniformly |
| Example 21 | 0 | 0 | 0 | 0 | 0 | 1.1 | Dyed, deeply, uniformly |
| Example 22 | 0 | 0 | 0 | 0 | 0 | 0.8 | Dyed, deeply, uniformly |
| Example 23 | 0 | 0 | 0 | 0 | 0 | 0.9 | Dyed, deeply, uniformly |
| Example 24 | 0 | 0 | 0 | 0 | 0 | 0.8 | Dyed, deeply, uniformly |
| W (Control) | 0 | 0 | 0 | Δ | 0 | 1.4 | Dyed, deeply, uniformly |
| Example 25 | 0 | 0 | 0 | 0 | 0 | 0.9 | Dyed, deeply, uniformly |
| Example 26 | 0 | 0 | 0 | 0 | 0 | 0.6 | Dyed, deeply, uniformly |
| X (Control) | Δ | x | Δ | 0 | 0 | 0.4 | Dyed, deeply, uniformly |
| Y (Control) | x | Δ | Δ | 0 | 0 | 0.5 | Dyed, deeply, uniformly |

*¹ = The conditions were the same as in Example 1.

What is claimed is:

1. A coating composition comprising:

5 to 90 parts by weight of a monomer mixture (A), which monomer mixture consists essentially of:
(1) from about 30 to about 95% by weight of a polyfunctional monomer of a mono or polypentaerythritol poly(meth)acrylate having at least three (meth)acryloyloxy groups per molecule and represented by the formula:

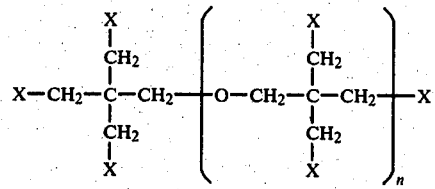

wherein at least 3 of X are $CH_2=CR-COO-$ groups and the rest are $-OH$ groups, n is an integer of 0 to 4 and R is hydrogen or a methyl group;
(2) up to about 60% by weight of a bifunctional monomer represented by the formula:

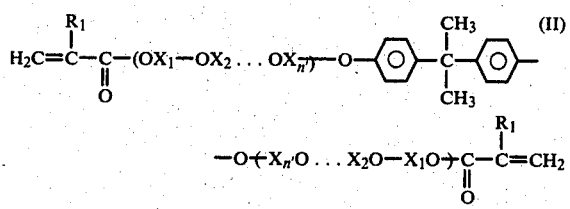

wherein $R_1$ is hydrogen or a methyl group, $X_1$, $X_2$, $-X_n'_2$ which may be the same or different, alkylene groups containing at least 6 carbon atoms or of an alkylene-type group containing at most 6 carbon atoms in which one hydrogen atom is replaced with a hydroxyl group, and $n'_2$ is an integer of 0 to 5;
(3) from about 3 to about 40% by weight of a monomer containing not more than 2 (meth)acryloyloxy groups in one molecule, having a boiling point not below 150° C. under atmospheric pressure and a viscosity not higher than 20 centipoises at 20° C.;
(4) from about 1 to about 20% by weight of a phosphoric acid ester-type monomer represented by the formula

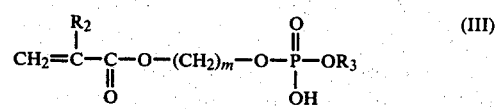

wherein $R_2$ is hydrogen or a methyl group, $R_3$ is hydrogen or a

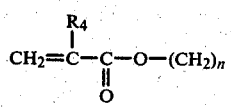

group, $R_4$ is hydrogen or a methyl group, n and m are an integer of 1 to 5; and
(5) from about 1 to about 10% by weight of an ethanolamine-type compound represented by the formula:

wherein each of $R_5$ and $R_6$ is independently hydrogen, an alkyl group of 1 to 15 atoms or a $CH_2CH_2OH$ group);
(B) from about 95 to about 10 parts by weight of at least one organic solvent that forms a uniform solution when mixed with said monomer mixture (A); and
(C) up to 10 parts by weight of a photosensitizing agent per 100 parts by weight of the total of the mixture (A) and organic solvent (B);
said coating capable of forming a dyeable cross-linked, hardened film high in abrasion resistance, surface smoothness and antistaticity when irradiated with active energy rays in air.

2. The coating composition according to claim 1 wherein said polyfunctional monomer (1) is selected from the group consisting of pentaerythritol tri(meth)acrylate, pentaerythritol tetra(meth)acrylate, dipentaerythritol tri(meth)acrylate, dipentaerythritol tetra(meth)acrylate, dipentaerythritol penta(meth)acrylate and dipentaerythritol hexa(meth)acrylate.

3. The coating composition according to claim 1 wherein said phosphoric acid ester type monomer (4) is selected from the group consisting of acryloxyethyl phosphate, methacryloxyethyl phosphate, dimethacryloxyethyl phosphate and diacryloxyethyl phosphate.

4. The coating composition according to claim 1 wherein said ethanolamine type compound (5) is a diethanolamine having 4 to 15 carbon atoms.

5. The coating composition according to claim 1 wherein said monomer mixture (A) further contains 3 to 40% by weight of a polyethyleneglycol mono or di(meth)acrylate monomer (6) represented by the formula:

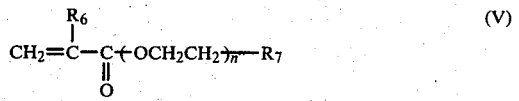

wherein $R_6$ is hydrogen or a methyl group, $R_7$ is an alkoxy or a (meth)acryloyloxy group of 1 to 5 carbon atoms and n'' is an integer of 5 to 30.

6. The coating composition according to claim 1 wherein the viscosity of said monomer mixture (A) is not higher than 1,000 centipoises at 20° C.

7. The coating composition according to claim 1 wherein said polyfunctional monomer (1) is present to the extent of about 35 to about 94% by weight of monomer mixture (A).

8. The coating composition according to claim 1 wherein said monomer mixture contains from about 0.1% by weight of said bifunctional monomer (2).

9. The coating composition according to claim 8 wherein said bifunctional monomer (2) is selected from the group consisting of 2,2 bis(4 acryloxyphenyl)propane; 2,2 bis(4 methacryloxyphenyl)propane; 2,2 bis(4 acryloxyethoxyphenyl)propane; 2,2 bis(4 methacryloxyethoxyphenyl)propane; 2,2 bis(4 acryloxydiethoxyphenyl)propane; 2,2 bis(4 methacryloxydiethoxyphenyl)propane; 2,2 bis(4 acryloxypropoxyphenyl)propane; 2,2 bis(4 methacryloxypropoxyphenyl)propane; 2,2 bis[4 acryloxy(2 hydroxypropoxy)phenyl]propane; 2,2 bis[4 methacryloxy(2 hydroxypropoxy)phenyl]propane; 2,2 bis[4 acryloxy(2 hydroxypropoxyethoxy)- phenyl]propane and 2,2 bis[4 methacryloxy(2 hydroxy-propoxyethoxy)phenyl]propane.

10. The coating composition according to claim 1 wherein said monomer mixture (A) contains from about 3 to about 15% by weight of said phosphoric acid ester-type monomer (4).

11. The coating composition according to claim 1 wherein said monomer mixture (A) contains from about 2 to about 6% by weight of said ethanolamine-type compound (5).

12. The coating composition according to claims 10 or 11 wherein the weight ratio of component (4) to component (5) is within the range of 0.5:1 to 5:1.

13. The coating composition according to claim 1 wherein said organic solvent has a boiling point in the range of about 50° to about 200° C. at atmospheric pressure and a viscosity at room temperature not greater than 10 centipoise.

14. The coating composition according to claim 13 wherein the boiling point of said organic solvent (B) is in the range of about 60° to about 150° C.

15. The coating composition according to claim 1 wherein the amount of said photosensitizing agent (C) is about 0.01 to about 10 parts by weight of the total of components (A) and (B).

16. A coating composition comprising:
5 to 90 parts by weight of a monomer mixture (A), which monomer mixture consists essentially of:
(1) from about 30 to about 95% by weight of a polyfunctional monomer of a mono or polypentaerythritol poly(meth)acrylate having at least three (meth)acryloyloxy groups per molecule and represented by the formula:

$$X-CH_2-\underset{\underset{\underset{X}{|}}{\overset{\overset{X}{|}}{|}}{CH_2}}{\overset{CH_2}{|}}{C}-CH_2-\left[O-CH_2-\underset{\underset{\underset{X}{|}}{\overset{\overset{X}{|}}{|}}{CH_2}}{\overset{CH_2}{|}}{C}-CH_2\right]_n-X$$

wherein at least 3 of X are $CH_2\!=\!CR\!-\!COO\!-$ groups and the rest are $-OH$ groups, n is an integer of 0 to 4 and R is hydrogen or a methyl group;

(2) from about 0.1 to about 60% by weight of a bifunctional monomer represented by the formula:

$$H_2C=\underset{\underset{O}{\|}}{\overset{\overset{R_1}{|}}{C}}-C-(OX_1-OX_2\ldots OX_{n'})-O-\underset{\underset{CH_3}{|}}{\overset{\overset{CH_3}{|}}{C}}-$$ (II)

$$-O(X_{n'}O\ldots X_2O-X_1O)\underset{\underset{O}{\|}}{\overset{\overset{R_1}{|}}{C}}-C=CH_2$$

wherein $R_1$ is hydrogen or a methyl group, $X_1$, $X_2$, $-X_{n'2}$ which may be the same or different, alkylene groups containing at least 6 carbon atoms or of an alkylene-type group containing at most 6 carbon atoms in which one hydrogen atom is replaced with a hydroxyl grtoup, and $n'_2$ is an integer of 0 to 5;

(3) from about 3 to about 40% by weight of a monomer containing not more than 2 (meth)acryloyloxy groups in one molecule, having a boiling point not below 150° C. under atmospheric pressure and a viscosity not higher than 20 centipoises at 20° C.;

(4) from about 3 to about 15% by weight of a phosphoric acid ester-type monomer represented by the formula:

$$CH_2=\underset{\underset{O}{\|}}{\overset{\overset{R_2}{|}}{C}}-C-O-(CH_2)_m-O-\underset{\underset{OH}{|}}{\overset{\overset{O}{\|}}{P}}-OR_3$$ (III)

wherein $R_2$ is hydrogen or a methyl group, $R_3$ is hydrogen or a $$CH_2=\underset{\underset{O}{\|}}{\overset{\overset{R_4}{|}}{C}}-C-O-(CH_2)_n$$

group, $R_4$ is hydrogen or a methyl group, n is as defined above and m is an integer of 1 to 5; and (5) from about 2 to about 6% by weight of an ethanolamine-type compound represented by the formula:

$$NR_5R_6(CH_2CH_2OH)$$ (IV)

wherein each of $R_5$ and $R_6$ is independently hydrogen, an alkyl group of 1 to 15 carbon atoms or a $CH_2CH_2OH$ group);

(B) from about 95 to about 10 parts by weight of at least one organic solvent that forms a uniform solution when mixed with said monomer mixture (A) and having a boiling point in the range of about 50° to about 200° C.; and (C) from about 0.01 to about 10 parts by weight of a photosensitizing agent per 100 parts by weight of the total of the monomer mixture (A) and organic solvent (B);

said coating capable of forming a dyeable cross-linked, hardened film high in abrasion resistance, surface smoothness and antistaticity when irradiated with active energy rays in air.

17. A process for providing a dyeable, cross-linked hardened film exhibiting substantial abrasion resistance, antistaticity and a smooth surface, said processing comprising (i) applying the coating composition of claim 14 to the surface of a synthetic resin article, and (ii) exposing the thus-applied coating to cross-linking energy rays thereby cross-linking and curing the coating and forming a hardened film on said article.

18. The process according to claim 17 wherein said synthetic resin is selected from the group consisting of polymethyl methacrylate, polycarbonate, polyallyldiglycol carbonate and mixtures thereof.

19. A coated, abrasion resistant optical lens produced according to the process of claim 18.

20. A coated, abrasion resistant lighting fixture cover produced according to the process of claim 18.

21. A coated, abrasion resistant eyeglass lens produced according to the process of claim 18.

* * * * *